United States Patent
Vogler (10) Patent No.: US 9,056,427 B2
(45) Date of Patent: Jun. 16, 2015

(54) ULTRASONIC TREATMENT DEVICE AND TRANSVERSE SEALING SONOTRODE FOR THE SAME

(75) Inventor: Ulrich Vogler, Uhldingen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 644 days.

(21) Appl. No.: 13/256,955

(22) PCT Filed: May 27, 2010

(86) PCT No.: PCT/EP2010/057362
§ 371 (c)(1),
(2), (4) Date: Sep. 16, 2011

(87) PCT Pub. No.: WO2010/145927
PCT Pub. Date: Dec. 23, 2010

(65) Prior Publication Data
US 2012/0012258 A1    Jan. 19, 2012

(30) Foreign Application Priority Data

Jun. 16, 2009  (DE) ................. 10 2009 026 952

(51) Int. Cl.
| B32B 37/00 | (2006.01) |
| B29C 65/00 | (2006.01) |
| B29C 65/08 | (2006.01) |
| B29C 65/74 | (2006.01) |
| B65B 51/22 | (2006.01) |
| B65B 51/30 | (2006.01) |

(Continued)

(52) U.S. Cl.
CPC ......... *B29C 66/83513* (2013.01); *Y10T 156/12* (2015.01); *B29C 65/087* (2013.01); *B29C 65/7443* (2013.01); *B29L 2031/7128* (2013.01); *B65B 9/067* (2013.01); *B65B 51/225* (2013.01); *B65B 51/306* (2013.01); *B29C 65/088* (2013.01); *B29C 66/81423* (2013.01); *B29C 66/81431* (2013.01); *B29C 66/9513* (2013.01)

(58) Field of Classification Search
USPC ............... 156/73.1, 73.3, 250, 251, 510, 515, 156/530, 580.1, 580.2; 264/442, 443, 444, 264/445; 425/174.2; 228/110.1, 1.1; 310/323.01, 323.18
See application file for complete search history.

(56) References Cited

U.S. PATENT DOCUMENTS

| 3,224,915 A | * | 12/1965 | Kuris et al. .................. 156/73.1 |
| 4,975,133 A | * | 12/1990 | Gochermann ............... 156/73.1 |
| 5,643,396 A | | 7/1997 | Rajala et al. |

(Continued)

FOREIGN PATENT DOCUMENTS

| DE | 69626965 T2 | 2/2004 |
| EP | 0894612 A2 | 2/1999 |

(Continued)

*Primary Examiner* — James Sells
(74) *Attorney, Agent, or Firm* — Paul & Paul (57) ABSTRACT

The present invention concerns a sonotrode for a device for continuously processing material webs by means of ultrasound. To provide a sonotrode and an ultrasonic processing device having a sonotrode which is simple to produce and ensures reliable transverse sealing seam production, wherein the energy consumption of the sonotrode is low and the sonotrode also has a high level of rotational truth accuracy and adequate stiffness, it is proposed according to the invention that the sonotrode comprises a substantially roller-shaped core and at least two bars, wherein the bars extend in the direction of the core axis and each have a sealing surface facing away from the roller-shaped core.

11 Claims, 13 Drawing Sheets

(51) Int. Cl.
*B29L 31/00* (2006.01)
*B65B 9/067* (2012.01)

(56) References Cited

U.S. PATENT DOCUMENTS

| | | | |
|---|---|---|---|
| 5,707,483 | A | 1/1998 | Nayar et al. |
| 6,574,944 | B2 | 6/2003 | Capodieci |
| 7,658,053 | B2 * | 2/2010 | Honegger ............... 53/450 |
| 8,028,503 | B2 * | 10/2011 | Capodieci ............... 53/479 |
| 2005/0034820 | A1 | 2/2005 | Schneider |
| 2006/0086068 | A1 | 4/2006 | Capodieci |

FOREIGN PATENT DOCUMENTS

| | | |
|---|---|---|
| EP | 1815966 A2 | 8/2007 |
| EP | 1868182 A1 | 12/2007 |
| JP | 2001354210 A | 12/2001 |
| WO | 9414583 | 7/1994 |
| WO | 2007012917 A1 | 2/2007 |
| WO | 2008102250 A1 | 8/2008 |
| WO | 2008102550 A1 | 8/2008 |

* cited by examiner

ULTRASONIC TREATMENT DEVICE AND TRANSVERSE SEALING SONOTRODE FOR THE SAME

BACKGROUND OF THE INVENTION

The present invention concerns a device for continuously processing material webs with ultrasound and a sonotrode therefor.

Ultrasound is a mechanical oscillation above the audible limit. The frequency range begins at about 20 kHz and extends to frequencies of 1 GHz. Such ultrasonic frequencies are frequently generated by means of piezoelectric sound transducers (converters) from electrical energy. That mechanical oscillation energy is applied to the workpiece or the material to be processed by way of the sonotrode which is connected to the converter, possibly by way of an amplitude transformation member (also referred to as a booster).

The surface of the sonotrode intended to come into contact with the material to be processed is also referred to as the sealing surface. The oscillating unit thus comprises generator, converter, optionally the amplitude transformation member and the sonotrode. The converter and the sonotrode are formed in one piece for many use situations.

To effectively transmit the ultrasonic oscillation by means of the ultrasonic oscillating unit it is necessary to cause the ultrasonic oscillating unit to assume a resonance condition. In dependence on the structure of the ultrasonic oscillating unit it has a multiplicity of natural frequencies. It is only when the converter generates a natural frequency of the ultrasonic oscillating unit that resonant oscillation of the unit occurs. Therefore the converter and ultrasonic oscillating unit must be tuned to each other.

When processing materials by means of ultrasound generally the material to be processed is positioned between the sonotrode and a counterpart tool (not belonging to the oscillating structure), which is also referred to as the anvil. The sonotrode in contact with the material to be processed then transmits the ultrasonic energy to the material to be processed, which is for example thereby welded or severed.

Packaging technology frequently uses so-called horizontal or vertical tubular bag packaging machines. Therein a web of material is drawn from the roll, shaped to form a tube and the longitudinal edges are sealed. Thereafter the bag is filled, sealed in the transverse direction and finally cut off. Therefore welding of the transverse seam produces both the head seam of the filled bag and also the bottom seam of the next bag.

Ultrasonic sonotrodes are frequently used to produce the longitudinal seam in the tubular bag packaging machines. In that case the webs of material to be joined are moved continuously between the sonotrode and the counterpart tool.

Mostly hot sealing devices are used at the present time for producing the transverse sealing seam. Recently however ultrasonic processing devices are also used individually for producing the transverse sealing seam. These however are generally discontinuously operating sonotrodes, that is to say the sonotrode does not rotate but the substantially rectangular sealing surface is periodically brought into contact with the material web to produce the transverse sealing seam.

U.S. Pat. No. 6,574,944 already proposed rotational sonotrodes for producing a transverse sealing seam by means of ultrasound. In the embodiment shown therein, four separate sonotrodes are mounted on a parallelepipedic drive shaft. When the drive shaft is rotated the four sonotrodes are successively brought into contact with the material web and produce a respective transverse sealing seam.

The embodiment with four sonotrodes mounted on a shaft however is complicated and expensive to produce. In addition, it is only possible with a high energy consumption to cause the sealing surfaces of the four sonotrodes to oscillate by way of the drive shaft. Therefore the structure shown in U.S. Pat. No. 6,574,944 has not been successful in practice.

SUMMARY OF THE INVENTION

Therefore the object of the present invention is to provide a sonotrode or an ultrasonic processing device having a sonotrode which is simple to produce and ensures reliable transverse sealing seam production, wherein the energy consumption of the sonotrode is low. In addition the invention seeks to provide that the sonotrode has a high degree of rotational truth accuracy and adequate stiffness.

According to the invention that object is attained in that the sonotrode comprises a substantially roller-shaped core and at least two bars, wherein the bars extend in the direction of the core axis and each have a sealing surface facing away from the roller-shaped core. Basically the sonotrode according to the invention has a plurality of sealing surfaces. When the sonotrode is rotated along the longitudinal axis of the roller-shaped core the individual sealing surfaces will successively come into contact with the material web to be processed and produce a transverse sealing seam.

Such a sonotrode can be easily produced. Thus for example suitable cavities can be milled out of rod-shaped material so that only the bars remain and the sealing surfaces are formed substantially by the peripheral surface of the rod-shaped material. Therefore the bars are preferably produced in one piece with the roller-shaped core. That measure reduces the energy loss upon excitation of the sealing surface as transmission losses in transmission of the ultrasonic oscillation from the roller-shaped core to the bars are reduced. In addition assembly tolerances are reduced by dispensing with the connecting locations, which overall leads to increased rotational truth accuracy.

In a preferred embodiment the contour of the sealing surfaces in a section perpendicular to the roller axis is convexly curved, wherein the radius of curvature of the sealing surfaces preferably approximately corresponds to the spacing of the sealing surface from the core axis. The convex curvature of the sealing surface in a section perpendicular to the roller axis improves the rotational truth accuracy of the sonotrode and therewith the quality of the transverse sealing seam which can be produced.

It has been found that the excitation energy, that is to say the energy necessary to cause the sealing surface to oscillate at a desired frequency and amplitude can be reduced if the spacing of the sealing surface from the core axis is greater than the core radius by between about 25 and 150% and preferably by between about 75 and 100%.

In addition tests have shown that the sealing result can be improved if the sealing surfaces are of a length l in the axial direction, that is to say parallel to of the core axis, wherein $0.4 \times \lambda \leq l \leq 0.6 \times \lambda$ wherein $\lambda$ is the wavelength of the ultrasonic oscillation of the sonotrode.

It will be appreciated that the wavelength can depend under some circumstances on the direction of propagation of the ultrasonic oscillation in the sonotrode. Even if the directional dependency is generally negligible the term wavelength $\lambda$ is used to denote the wavelength parallel to the core axis.

It will be appreciated that the sonotrode can be operated effectively only in the proximity of its natural frequency f as it is only then that a standing wave is produced, that is to say the sonotrode is in a position to store a considerable amount of energy which can be transmitted into the material to be processed when the sealing surface is applied to the material web. The speed of sound c depends on the material from which the sonotrode is made. The use of aluminum, titanium or steel has proven to be particularly advantageous. In the ideal case the sealing surface is of a length l, parallel to the core axis, corresponding to half the ultrasound wavelength.

It has been found however that the oscillation amplitude of the sealing surface decreases in the axial direction from the center of the sealing surface in the direction of the edge regions so that an optimum welding result is achieved in the edge regions of the sealing surface only when the energy input is increased, which however has the result that more energy is transmitted into the web of material than is necessary for sealing purposes, in the region of the center of the sealing surface. That can lead on the one hand to an increased energy demand and on the other hand even to a worsening of the sealing result if an excessive amount of energy is transmitted into the material web.

To reduce the variation in the oscillation amplitude in the longitudinal direction of the sealing surface, that is to say to reduce the drop in the oscillation amplitude from the center in the direction of the edge portions in the axial direction, it is advantageous if the bars have a connecting portion and a sealing portion carrying the sealing surface, wherein the sealing portion projects in the axial direction, that is to say in a direction parallel to the core axis, at least at one side and preferably at both sides, beyond the connecting portion by a value s≤0, wherein preferably 0.001×λ≤s≤0.2×λ. In other words the sealing surface projects in the axial direction beyond the connecting portion by about a hundredth to about a fifth of the ultrasound wavelength. The variation in the ultrasound amplitude along the sealing surface is markedly reduced by the specific shape of the bars.

In a preferred embodiment the connecting portions terminate directly at the roller-shaped core. The connecting portions and the sealing portions are advantageously of the same width in a cross-sectional view (sectional plane perpendicular to the core axis).

In a further preferred embodiment it is provided that the spacing d of the sealing surface from the core axis is between 40 and 60% of the ultrasound wavelength.

In a particularly preferred embodiment the sealing surface has a groove extending parallel to the core axis. That groove is provided to receive a corresponding cutting device arranged on a counterpart tool associated with the sonotrode. Basically the groove divides the sealing surface into two sealing surface portions, wherein the one sealing surface portion produces the bottom seam of a first pack and the other sealing surface portion produces the head seam of another pack while a corresponding cutting device severs the adjacent packs. Due to the provision of the groove a corresponding cutting blade can easily penetrate into the groove and sever the material. In that way both the cutting blade and also the sealing surface are processed carefully as they do not come into contact with each other during the cutting operation. Alternatively, to protect the sealing surface, it would also be possible for a protective coating which is possibly provided in the region in which the sealing surface comes into contact with the cutting tool during the cutting operation to be made thicker.

As an alternative thereto the cutting device can also be arranged in the sonotrode. In that case the counterpart tool can have a corresponding groove into which the cutting device of the sonotrode can engage during the cutting operation.

The present invention further concerns an ultrasonic processing device for continuously processing a material web by means of ultrasound with an ultrasonic oscillating unit comprising a converter and a sonotrode connected thereto optionally by way of an amplitude transformation portion, of the kind described and a counterpart tool, wherein for processing a material web it can guided between the sonotrode and the counterpart tool. In that case the core axis is arranged perpendicularly to the material advance direction. The sonotrode is rotated about its core axis during the ultrasonic processing operation.

As already explained in the opening part of this specification the oscillation amplitude which is produced at the sealing surface of the sonotrode is not uniform along the sealing surface. Instead the oscillation amplitude is at its greatest approximately in the center of the oscillation surface while it becomes smaller in the axial direction, that is to say in a direction parallel to the roller axis, towards the edge regions. In order therefore to ensure optimum sealing in the edge regions the supplied energy and thus the amplitude must be increased, which however has the consequence that an unnecessarily large amount of energy is transmitted in the region of the center of the sealing surface.

To improve the sealing quality over the entire length of the sealing surface and at the same time to reduce the necessary energy for sealing a transverse sealing seam a particular embodiment provides that a second sonotrode is used as the counterpart tool, wherein preferably the second sonotrode is displaced relative to the first sonotrode along the core axis by the length v, wherein preferably the length v=¼×λ and λ is the wavelength of the ultrasonic oscillation in the first sonotrode. In that case the second sonotrode is preferably caused to oscillate at the same frequency as the first sonotrode.

The displacement of the first sonotrode by approximately a quarter wavelength with respect to the second sonotrode ensures that the region of the sealing surface of the first sonotrode which has a great oscillation amplitude comes into contact with a region of the sealing surface of the second sonotrode at which the oscillation amplitude is relatively slight. That measure provides that energy is transmitted into the material web more uniformly along the length of the sealing surfaces, whereby on the one hand the sealing result is improved and on the other hand energy is saved.

The sonotrode operating as the counterpart tool can possibly be excited by way of an amplitude transformer with its own converter. In that case the excitations of the two sonotrodes are preferably synchronized.

Alternatively however it is possible to dispense with active excitation in relation to the second sonotrode acting as the counterpart tool. More specifically because the first oscillating sonotrode clamps the material web between its sealing surface and the second sonotrode energy is transmitted not only into the material web but also therethrough into the second sonotrode which is thereby caused to oscillate.

DESCRIPTION OF THE DRAWINGS

Further features, advantages and possible uses will be clearly apparent from the following description of preferred embodiments and the associated Figures.

DETAILED DESCRIPTION OF THE INVENTION

Figure 1:
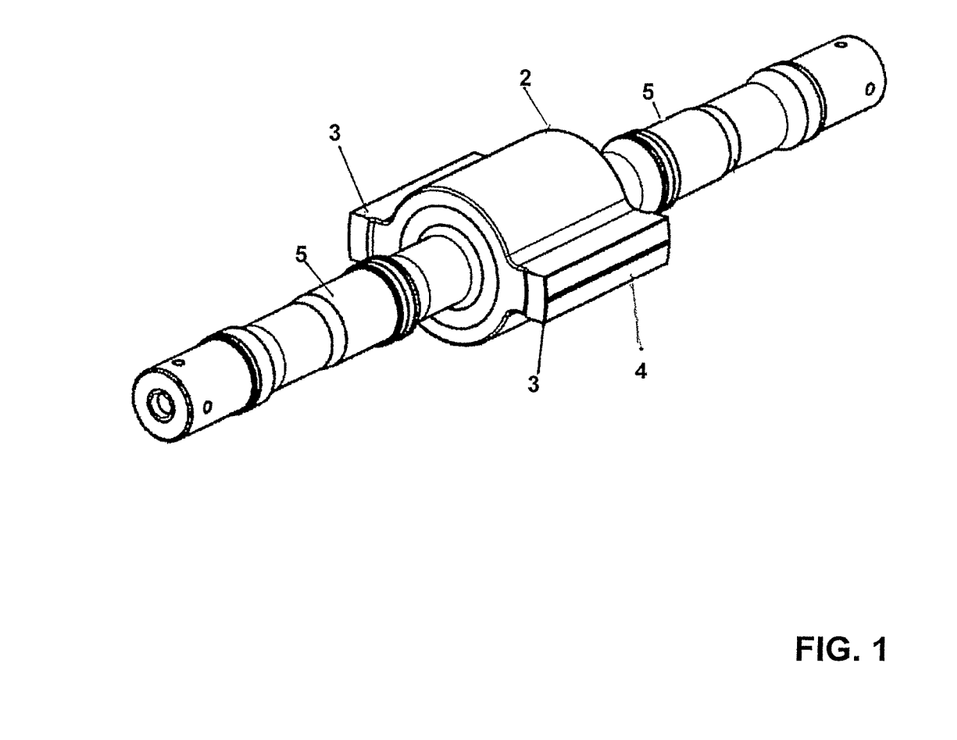
FIG. 1 shows a perspective view of a first embodiment of a sonotrode.
Figure 2:
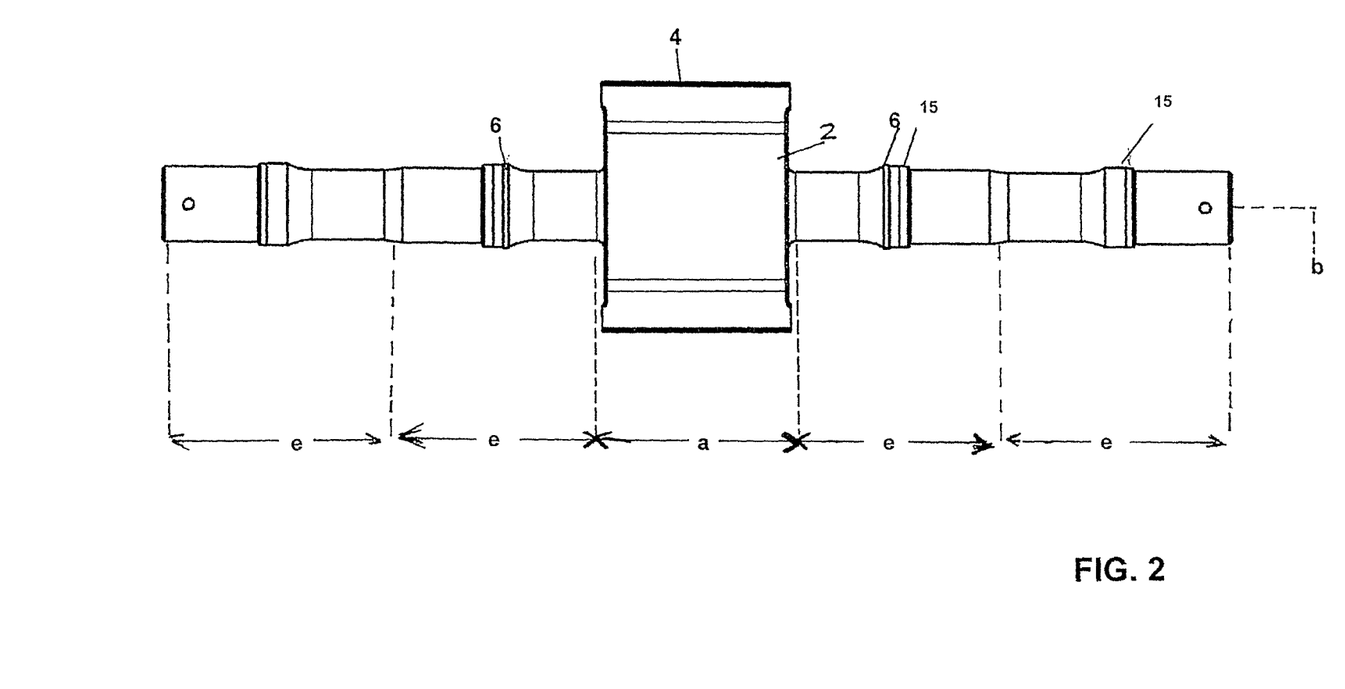
FIG. 2 shows side view of the FIG. 1 embodiment.

FIG. 1 shows a perspective view and FIG. 2 a side view of a first embodiment of the sonotrode according to the invention.

Two amplitude transformation members are formed at both sides of the sonotrode. The sonotrode has a substantially roller-shaped core 2, on which are shaped two radially mutually opposite bars 3 which extend radially outwardly beyond the roller surface. The bars 3 each have a respective sealing surface 4 which in operation is intended to come into contact with the material web to be processed. A respective shaft portion 5 adjoins the roller-shaped core 2 in both directions, in the axial direction.

The sonotrode is of a length a. Two amplitude transformation members of the length e adjoin at both sides. The amplitude transformation members can be formed integrally with the sonotrode. It will be appreciated that it is also possible to use only one amplitude transformation member.

A converter can then be mounted at one of the amplitude transformation members in the axial direction. In operation the sonotrode rotates about the axis b. The ultrasonic oscillation is transmitted into the illustrated structure by the converter, wherein the ultrasonic oscillation is firstly propagated axially. In addition however a radial ultrasonic oscillation is formed, which in the illustrated embodiment is used to process the material web. It will be seen from FIG. 2 that, in the illustrated embodiment, the sealing surface 4 projects in the axial direction, that is to say in a direction parallel to the axis of rotation b, somewhat beyond the roller-shaped core at both sides. A respective flange 6 is provided on the shaft portions of the sonotrode, the flange being provided to hold the sonotrode. The flanges 6 are disposed approximately at an axial oscillation node of the ultrasonic oscillation, that is to say there is almost no oscillation in the axial direction in the excited condition in the region of the flanges 6.

In the illustrated embodiment the sonotrode is held by way of the two directly successively arranged amplitude transformation members. The two amplitude transformation members carry a holder in the form of a holding sleeve 7 by way of which the ultrasonic oscillating unit can be mounted or fixed to a frame support structure. The ultrasonic oscillating unit is therefore not engaged at a single contact location but at two contact locations, whereby higher holding forces and in particular also flexural forces can be transmitted. The mounting should be in the form of a rotary mounting so that the sonotrode can rotate about its longitudinal axis b. The device has a very high level of flexural stiffness with optimum oscillation decoupling.

The holding sleeves 7 each at least partially embrace the respective amplitude transformation members. That means that fixing of the ultrasonic oscillating unit is not effected directly by contacting the amplitude transformation members, but the two amplitude transformation members carry a holding sleeve 7 which is then supported. That has the substantial advantage that, particularly in the case of rotary mountings, the two amplitude transformation members are held by way of a single mounting, thereby reducing the structural complication and expenditure.

Preferably the holding sleeve 7 contacts each of the two amplitude transformation members in the region of the oscillation nodes. That provides for optimum oscillation decoupling in the axial direction. In that respect the two amplitude transformation members advantageously have a particularly peripherally extending contact surface 15 for the holding arrangement, in the region of the oscillation nodes thereof. That oscillation node can be relatively precisely determined in the amplitude transformation member and therefore the contact surface can be accurately positioned. In addition such a contact surface is relatively easy to produce. The two amplitude transformation members can be produced discretely in the form of two components, but they can also be in the form of a single component.

To permit precise positioning of the holding arrangement on the amplitude transformation members it is provided that at least one of the amplitude transformation members has, adjoining the contact surface, a peripherally extending flange 6 against which the holding arrangement axially bears. That ensures that the holding arrangement assumes its correct position with respect to the amplitude transformation members and that in addition displacement of the holding arrangement on the amplitude transformation members is prevented by the flange. Decoupling in the radial direction is achieved by the holding sleeve so that the tube portion can be gripped in the middle thereof. That engagement and mounting point oscillates neither in the radial nor in the axial direction.

Figure 3:
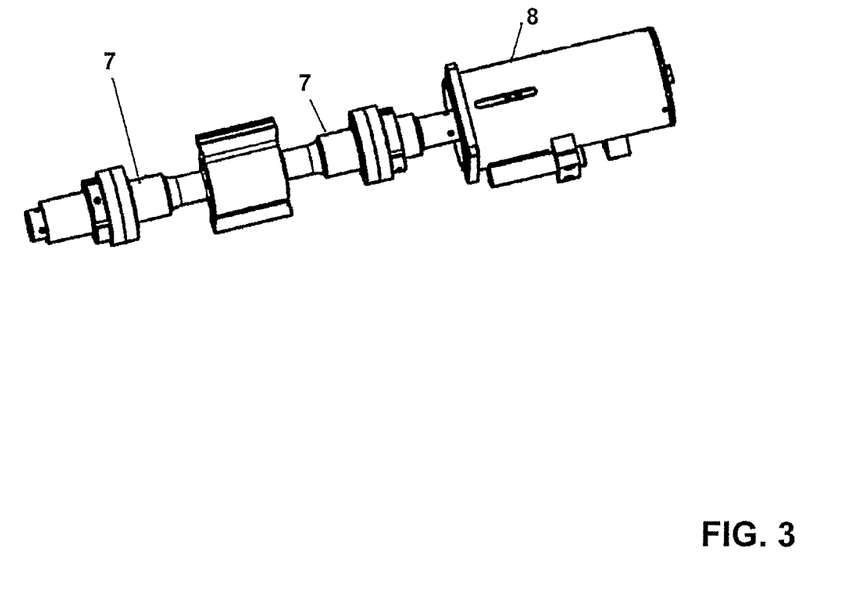
FIG. 3 shows a perspective view of the first embodiment of a sonotrode with converter.

FIG. 3 shows a perspective view of the sonotrode of FIGS. 1 and 2, wherein here additional holding sleeves 7 are provided, which engage the sonotrode at the flanges 6. In addition there is a converter 8, by means of which the ultrasonic oscillation is transmitted into the sonotrode.

Figure 4:
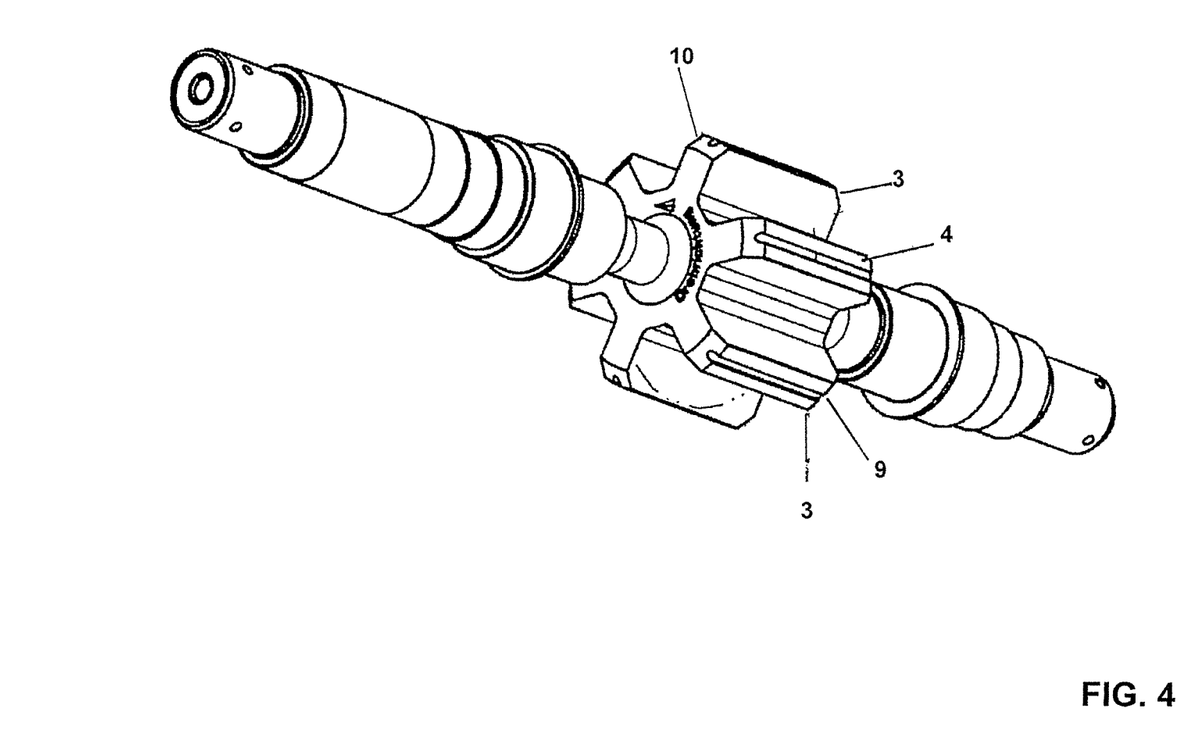
FIG. 4 shows a perspective view of a second embodiment of a sonotrode.

FIG. 4 shows a perspective view of a second embodiment of the sonotrode according to the invention. In this case the sonotrode has a total of six bars 3 which are uniformally spaced radially in the peripheral direction. The sealing surfaces 4 provided by the bars 3 have a groove 9 extending parallel to the axis of rotation in the illustrated embodiment. The groove 9 serves to receive a cutting tool accommodated on the counterpart tool so that both the head seam of a first pack, the bottom seam of the adjoining second pack and the cut between the first and second packs can be performed with the illustrated sonotrode.

The sealing surfaces 4 each have a respective chamfer 10 at their ends.

Figure 5:
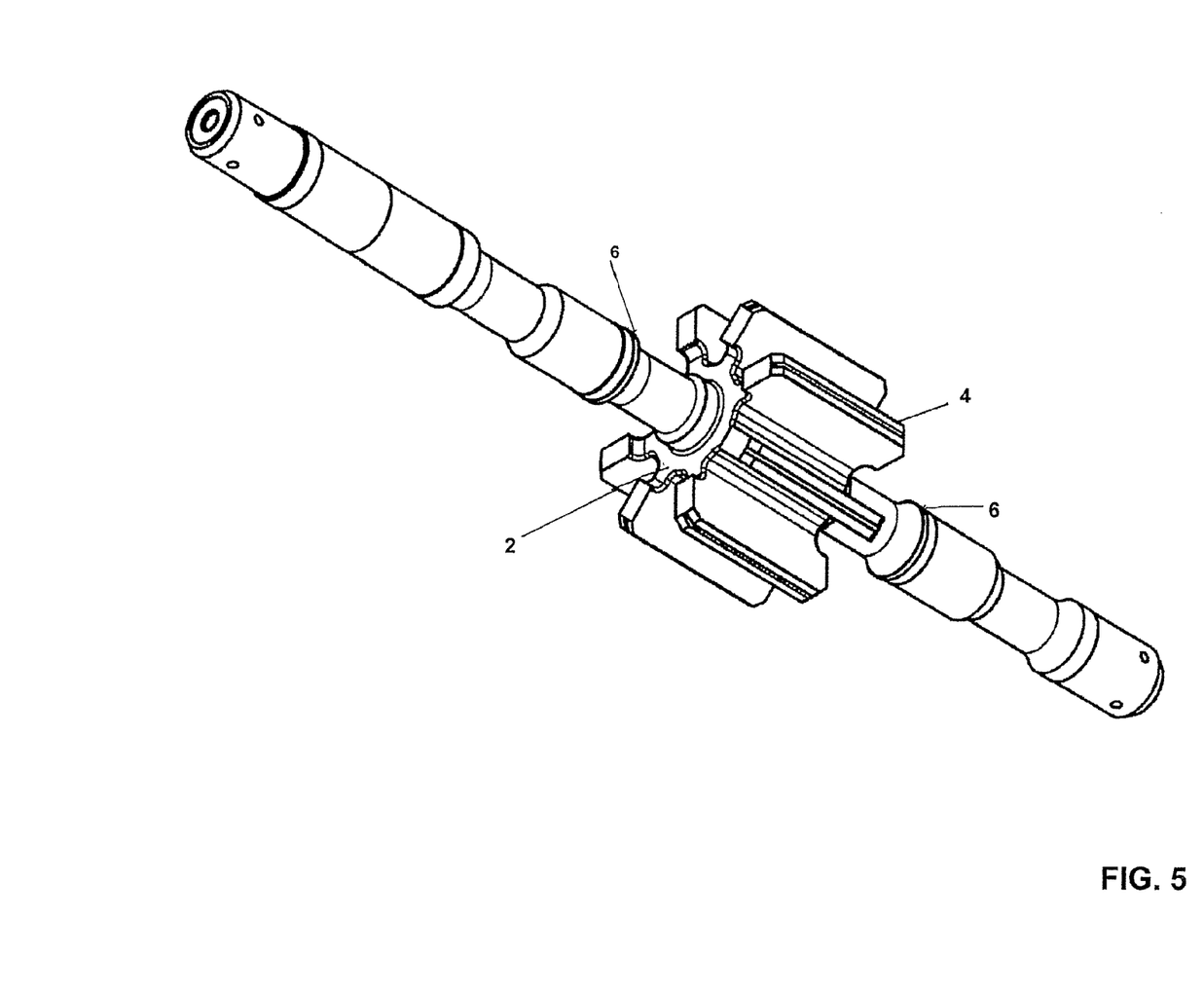
FIG. 5 shows a perspective view of a third embodiment of the invention.

FIG. 5 shows a perspective view of a third embodiment of the sonotrode. The FIG. 5 embodiment differs from the FIG. 4 embodiment substantially in that the sealing surfaces 4 project beyond the roller-shaped core 2 on both sides by a length s in the axial direction, that is to say in a direction parallel to the axis of rotation. Basically the bars comprise a connecting portion and a sealing portion having the sealing surface, wherein the sealing portion projects beyond the connecting portion in the direction of the core axis.

Figure 6:
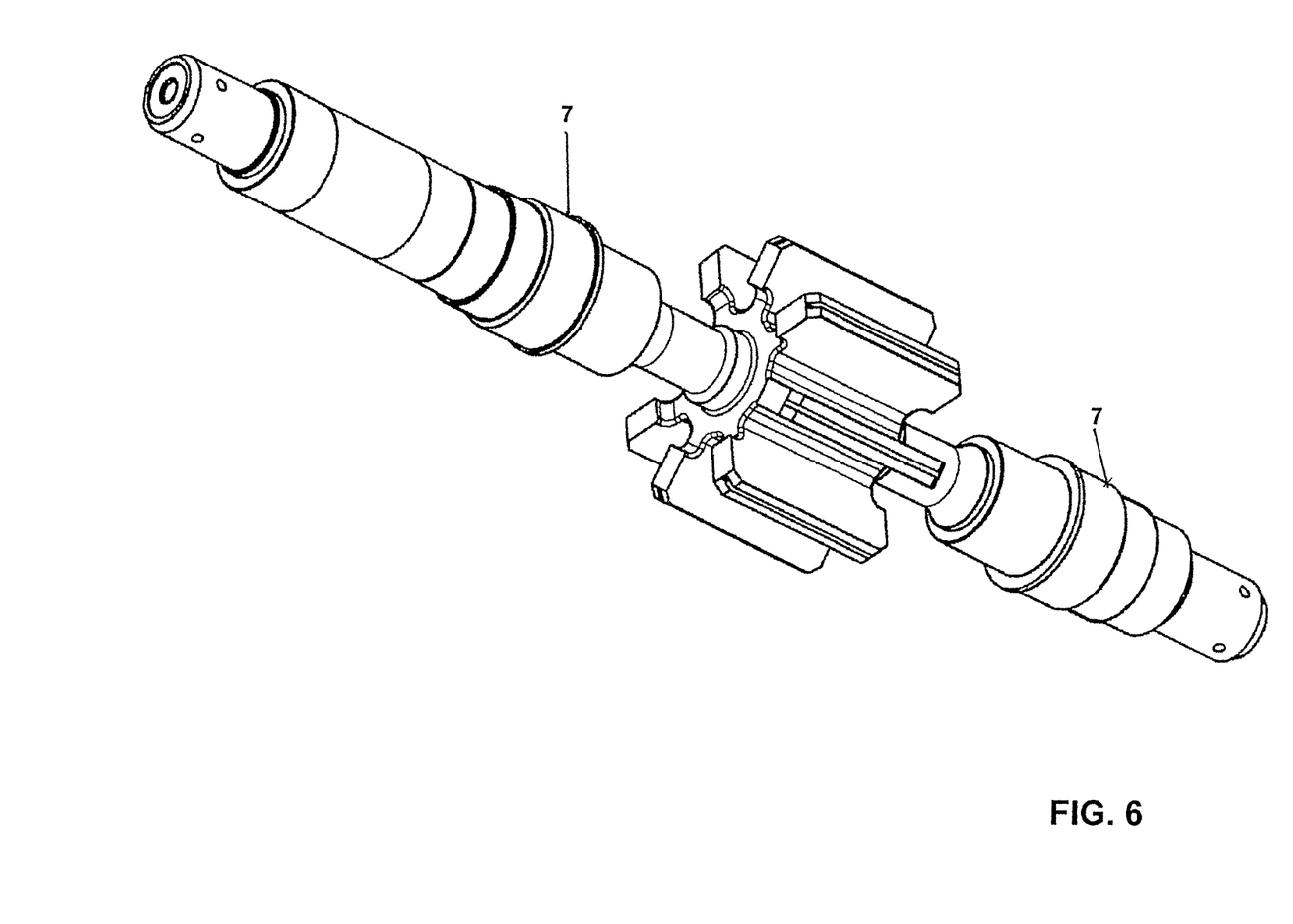
FIG. 6 shows a perspective view of the FIG. 5 embodiment with sleeves shrunk thereon.

FIG. 6 corresponds to the view in FIG. 5, while here connecting sleeves 7 are additionally shown, which come into contact with the flanges 6.

Figure 7:
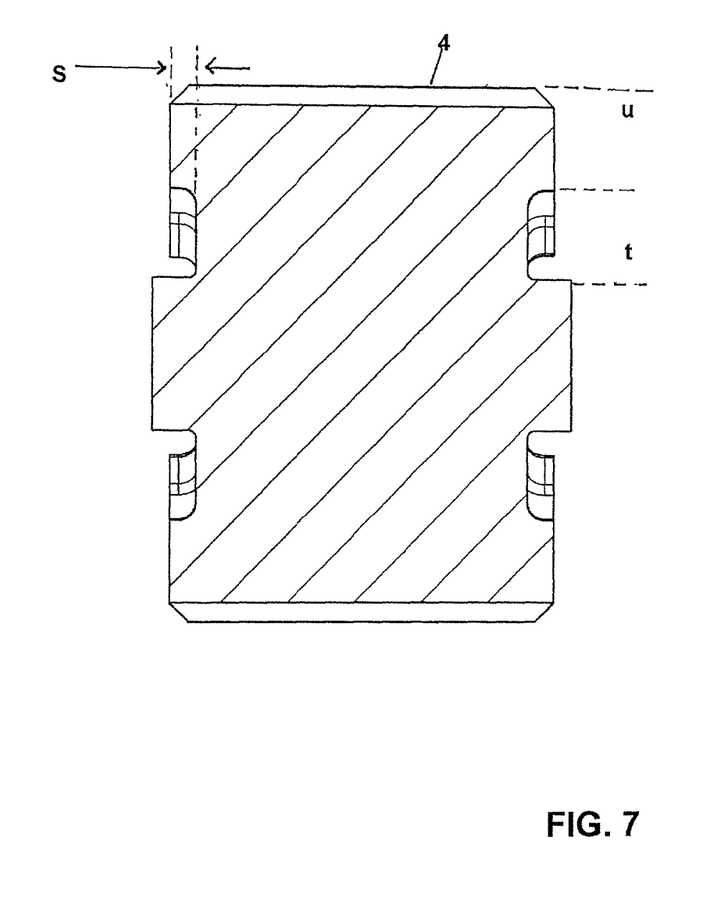
FIG. 7 shows a partial sectional view through the sonotrode of the third embodiment.

FIG. 7 shows a partial longitudinal section through the FIG. 5 embodiment. It will be seen here that the bars are subdivided into a connecting portion of the length t and a sealing portion u. The sealing portion projects beyond the connecting portion in the axial direction by the length s. That measure serves to achieve an oscillation amplitude which is as uniform as possible in the region of the sealing surface 4.

Figures 8, 9, 10:
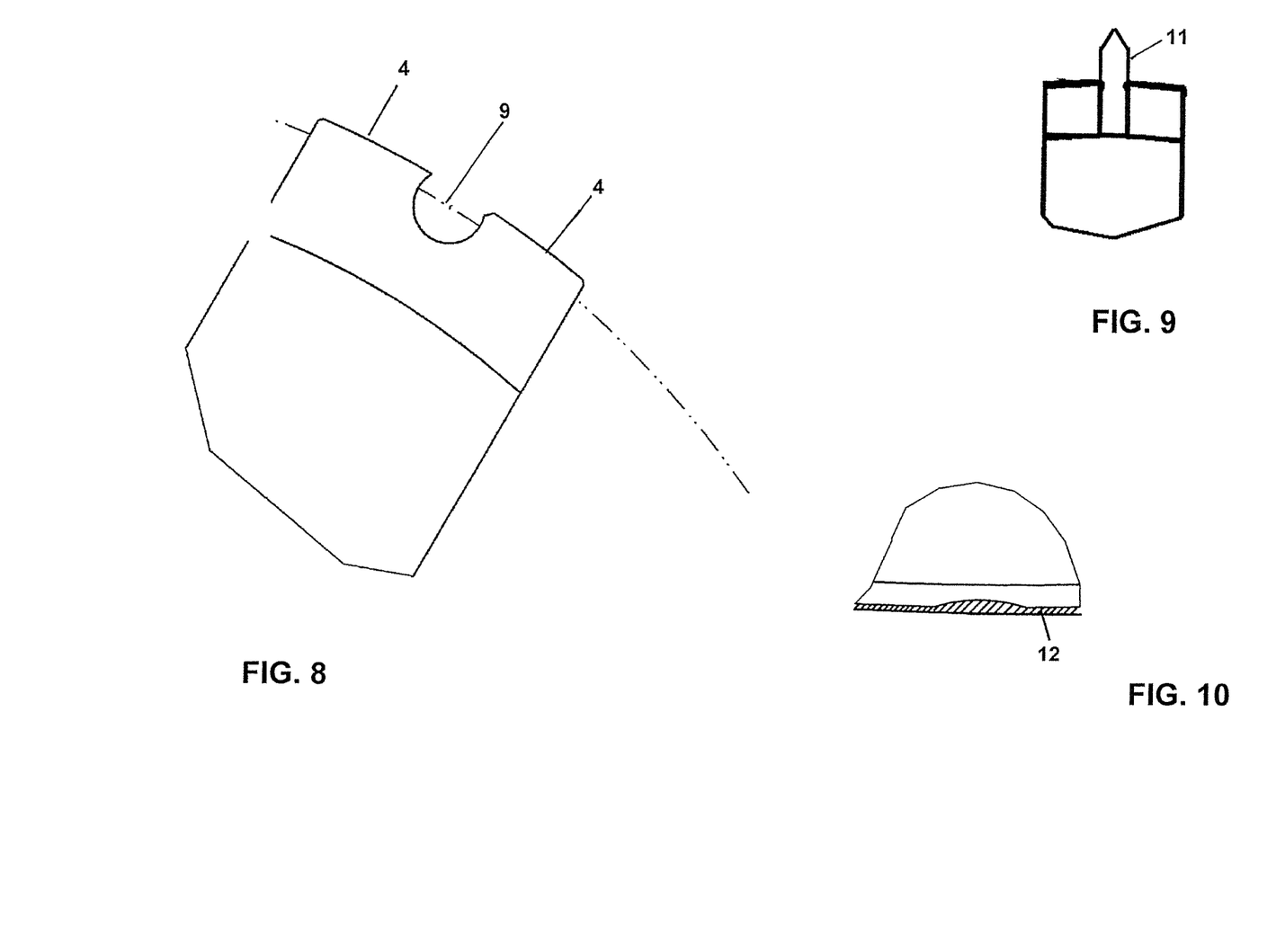
FIG. 8 shows a partial sectional view of the third embodiment of the sonotrode.
FIG. 9 shows a diagrammatic detail sketch of a fourth embodiment of a sonotrode.
FIG. 10 shows a diagrammatic sketch of a fifth embodiment of the sonotrode.

FIG. 8 shows a partial cross-section through the sonotrode of embodiments 2 and 3. It will be seen that the sealing surface 4 is subdivided by an axially extending groove 9. It will also be seen that the sealing surface in a sectional view perpendicularly to the core axis is convexly curved, the radius of curvature substantially corresponding to the spacing between the sealing surface 4 and the core axis. It will be appreciated that it is possible for the sealing surface 4 to be coated.

FIG. 9 shows a diagrammatic view in which a cutting tool 11 is let into the groove 9. The cutting tool is preferably also acted upon with ultrasonic oscillation in order easily to sever the material web to be processed. The cutting tool can be fixed in the groove for example by means of a clamping fit, by adhesive or by screw means.

FIG. 10 shows an example of a coating 12. In this case the coating 12 can be thicker in the region in which the cutting tool meets the sonotrode, if the sealing surface does not have a groove.

Figure 11:
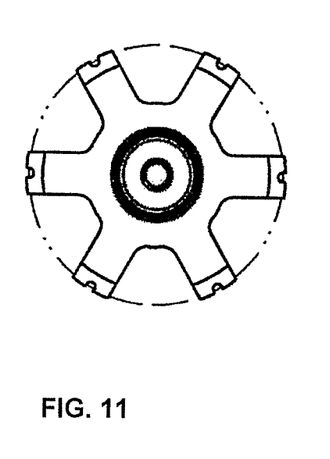
FIG. 11 shows a cross-sectional view of the third embodiment of the invention.
Figure 12:
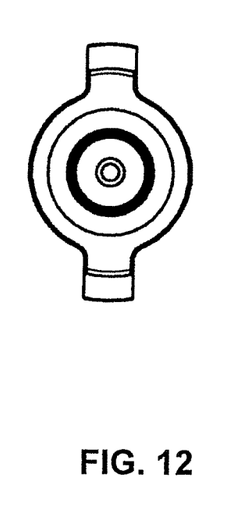
FIG. 12 shows a cross-sectional view of the first embodiment.

FIGS. 11 and 12 show cross-sectional views of the first and third embodiments of the sonotrode. The bars are equally spaced in the peripheral direction so that two bars are always disposed in radially mutually opposite relationship when an even number of bars is selected.

Figure 13:
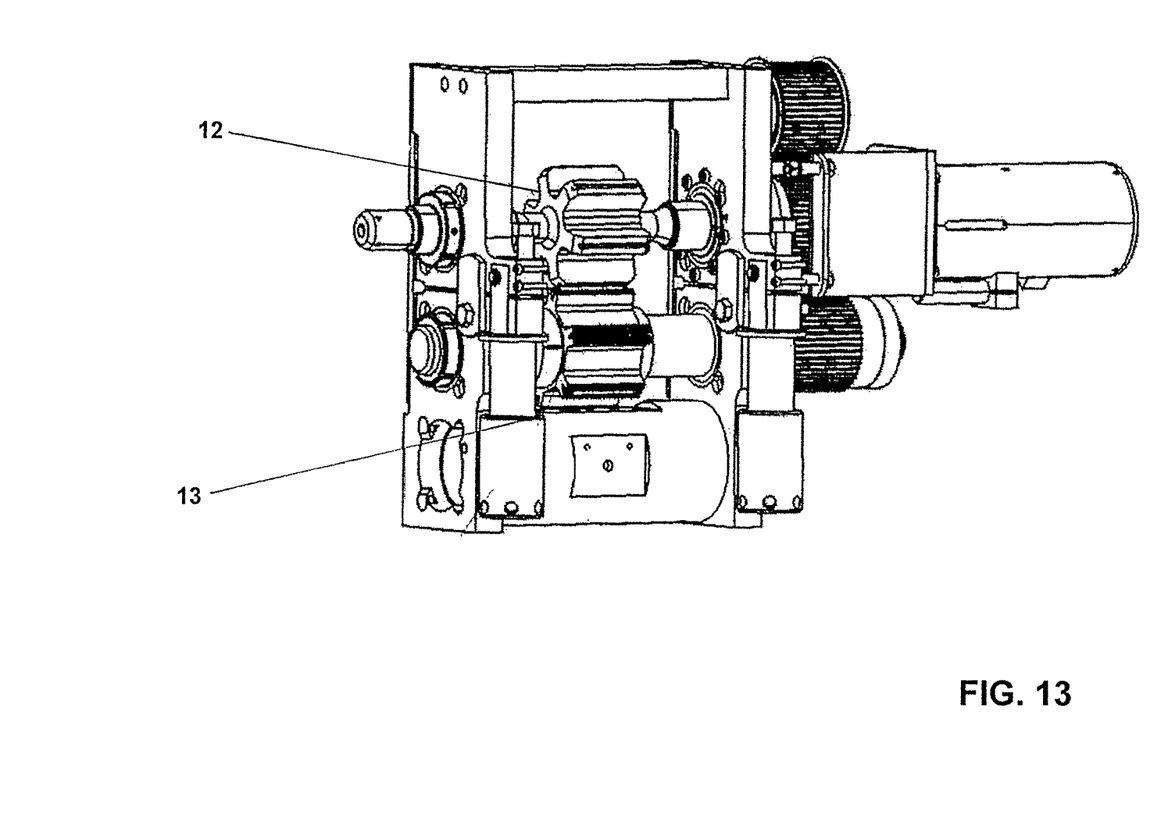
FIG. 13 shows a perspective view of an ultrasonic processing device with a sonotrode corresponding to the first embodiment of the invention.

FIG. 13 shows a perspective view of an ultrasonic processing device. That ultrasonic processing device serves for the production of transverse sealing seams, for example in a horizontal tubular bag packaging machine. For packaging the corresponding material to be packaged the material web is moved along between the sonotrode 12 according to the invention and a corresponding counterpart tool 13. In the illustrated embodiment the counterpart tool 13 also has bar-like portions. Whenever the sealing portion of the sonotrode 12 meets a corresponding bar surface of the counterpart tool 3 a transverse sealing seam is produced. The hollow spaces formed between the individual bars, the size of which is delimited by the roller-shaped core, serve to receive the material to be packaged.

Figure 14:
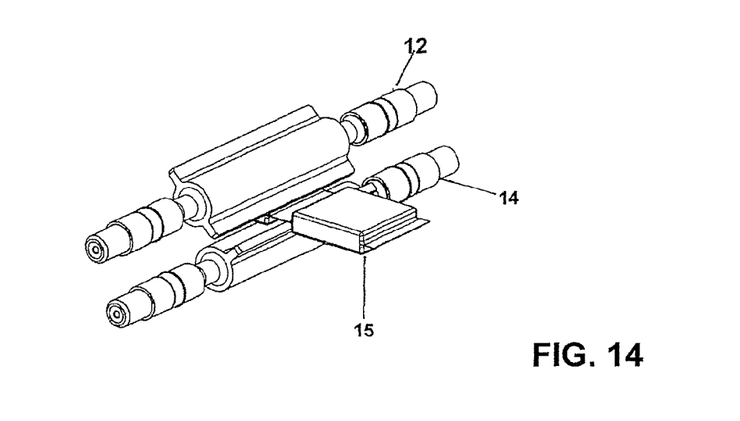
FIG. 14 shows a perspective detail view of a second embodiment of the ultrasonic processing device.

FIG. 14 shows a diagrammatic view of the mode of operation of an alternative embodiment. Here the material web to be processed is moved through between a sonotrode 12 which corresponds to the first embodiment and a counterpart tool 14 which is here also in the form of a sonotrode. It will be seen that the transverse sealing seam is produced when the two sealing surfaces of the two sonotrodes meet.

Figure 15:
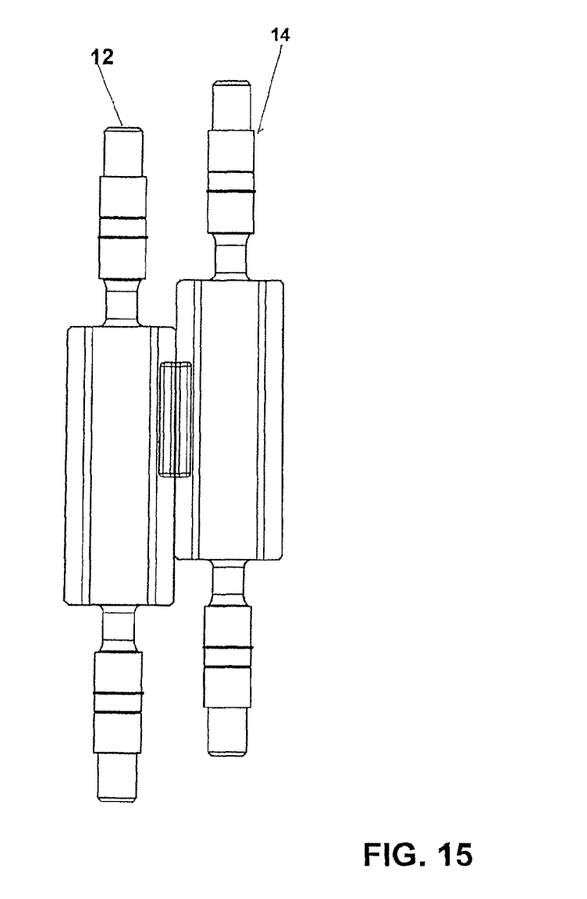
FIG. 15 shows a side view of a third embodiment of an ultrasonic processing device.
Figure 16:
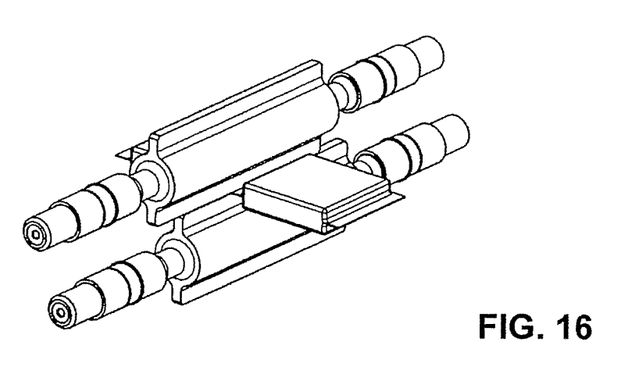
FIG. 16 shows a perspective partial view of the FIG. 15 embodiment.

As generally a non-homogenous oscillation amplitude is produced at the welding surface in the axial direction, that is to say in a direction parallel to the core axis, the alternative embodiment shown in FIGS. 15 and 16 provides that the sonotrode 14 serving as a counterpart tool is displaced in the axial direction with respect to the first sonotrode 12. In the ideal case the displacement approximately corresponds to a quarter wavelength of the ultrasonic oscillation.

Figure 17:
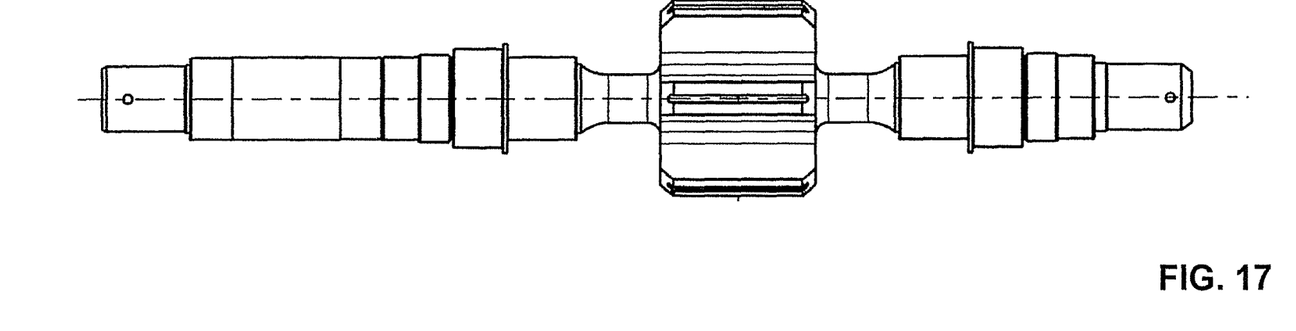
FIG. 17 shows a side view of the second embodiment of the sonotrode.
Figure 18:
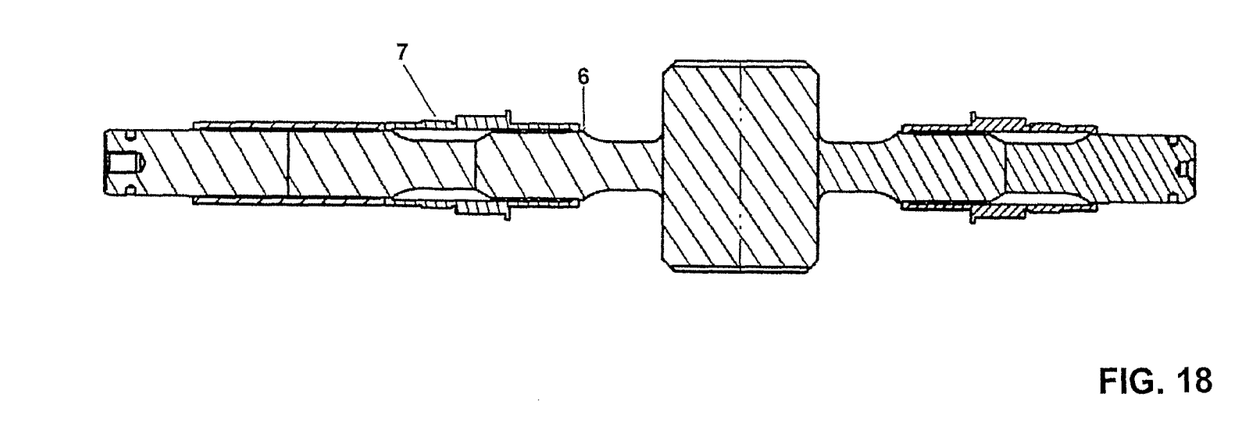
FIG. 18 shows a longitudinal sectional view through the sonotrode of FIG. 17.

FIGS. 17 and 18 show a side view (FIG. 17) and a longitudinal sectional view (FIG. 18) of the sonotrode of the second embodiment. It will be clearly seen from this view that the sleeves 7 engage the flanges 6 and the contact surfaces 15 of the sonotrode. The sleeves 7 can be for example shrunk onto the amplitude transformation members for fixing the sleeves 7 to the amplitude transformation members. Alternatively they can also be soldered in place or joined in another fashion.

LIST OF REFERENCES 1 ultrasonic processing device
2 core
3 bars
4 sealing surface
5 shaft portion
6 flange
7 holding sleeves
8 converter
9 groove
10 chamfer
11 cutting tool
12 sonotrode
13 counterpart tool
14 counterpart tool (sonotrode)
15 contact surface
b axis of rotation

The invention claimed is:

1. A sonotrode for a device for continuously processing material webs by means of ultrasound,
   characterized in that the sonotrode comprises a substantially roller-shaped core and at least two bars, wherein the bars extend in the direction of the core axis and each have a sealing surface facing away from the roller-shaped core,
   characterized in that the spacing of the sealing surface from the core axis is greater than the core radius by between about 25 and 150%, and
   further characterized in that the contour of the sealing surfaces in a section perpendicular to the roller axis is convexly curved, wherein the radius of curvature of the sealing surfaces preferably approximately corresponds to the spacing of the sealing surface from the core axis.

2. A sonotrode as set forth in claim 1 characterized in that the bars are formed integrally with the roller-shaped core.

3. A sonotrode as set forth in one of claim 2 or claim 1 characterized in that the spacing of the sealing surface from the core axis is greater than the core radius by between about 75 and 100%.

4. A sonotrode as set forth in one of claim 2 or claim 1 characterized in that the sonotrode has a natural frequency in the range of between 20 kHz and 1 GHz and the sealing surfaces are of a length "L" in the direction of the core axis, wherein $0.4 \times \lambda \leq L \leq 0.6 \times \lambda$ with $\lambda$ being the wavelength of the ultrasonic oscillation of the sonotrode.

5. A sonotrode as set forth in one of claim 2 or claim 1 characterized in that the sonotrode has a natural frequency in the range of between 20 kHz and 1 GHz and the bars have a connecting portion and a sealing portion with the sealing surface, wherein the sealing portion projects in the direction of the core axis and preferably at both sides by a value "s" beyond the connecting portion, wherein preferably $0.001 \times \lambda \leq s \leq 0.2 \times \lambda$, where $\lambda$ is the wavelength of the ultrasonic wave within the sonotrode.

6. A sonotrode as set forth in one of claim 2 or claim 1 characterized in that the sealing surface has a groove extending parallel to the core axis.

7. A sonotrode as set forth in one of claim 2 or claim 1 characterized in that the sealing surface has a cutting device extending parallel to the core axis.

8. An ultrasonic processing device for continuously processing a material web by means of ultrasound with an ultrasonic oscillating unit comprising a converter and a sonotrode connected thereto optionally by way of an amplitude transformation portion, as set forth in one of claim 2 or claim 1, and a counterpart tool, wherein for processing a material web it can guided between the sonotrode and the counterpart tool.

9. An ultrasonic processing device as set forth in claim 8 characterized in that there is provided a second said sonotrode which is used as a counterpart tool, wherein preferably the second sonotrode is displaced relative to the first sonotrode along the core axis by the length "v", wherein preferably the length $v=0.25 \times \lambda$, wherein $\lambda$ is the wavelength of the ultrasonic oscillation within the first sonotrode.

10. An ultrasonic processing device as set forth in claim 9 characterized in that there is provided a synchronization device which synchronizes the ultrasonic oscillation of the second sonotrode operating as the counterpart tool with the ultrasonic oscillation of the first sonotrode.

11. An ultrasonic processing device as set forth in claim 9 characterized in that the second sonotrode operating as the counterpart tool is not actively excited.

\* \* \* \* \*